United States Patent
Browall et al.

[15] 3,703,696
[45] Nov. 21, 1972

[54] HUMIDITY SENSOR

[72] Inventors: Kenneth W. Browall, Scotia; Leonard V. Interrante, Schenectady, both of N.Y.

[73] Assignee: General Electric Company

[22] Filed: Nov. 23, 1971

[21] Appl. No.: 201,279

[52] U.S. Cl. .................................338/35, 73/335
[51] Int. Cl. ..........................................H01c 13/00
[58] Field of Search .........338/35; 73/73, 335, 336.5, 73/338; 200/61.06; 340/235

[56] References Cited

UNITED STATES PATENTS

| 2,728,831 | 12/1955 | Pope | 73/336.5 X |
| 2,862,090 | 11/1958 | Mayer | 338/35 |
| 3,540,278 | 11/1970 | Diamond et al. | 73/336.5 |
| 2,510,018 | 5/1950 | Gillingham | 338/35 |
| 3,058,079 | 10/1962 | Jones | 338/35 |

Primary Examiner—C. L. Albritton
Attorney—John F. Ahern et al.

[57] ABSTRACT

A humidity sensor which responds to changes in atmosphere water content by changes in electrical resistance, has an electrically insulating substrate, a pair of spaced apart interdigitated electrodes positioned on one surface of the substrate, an electrical lead in contact with each of the electrodes, and a thin film of chloromethylated quaternized polystyrene containing from 3.3 to 8.6 percent chlorine adhering to the electrode surface of the sensor.

9 Claims, 6 Drawing Figures

HUMIDITY SENSOR

This invention relates to humidity sensors and, more particularly, to such humidity sensors which respond to changes in atmospheric water content by changes in electrical resistance.

A substantial increase in the need for accurate humidity measurement and control devices has occurred during the last decade. Areas of science and technology which have traditionally used humidity sensors, include meteorology, the processing and storage of foods, textiles and chemicals. Such areas require increasing numbers of such devices with a greater degree of precision and accuracy in their operation. New awareness of the importance of humidity control for human health and comfort has resulted in the increased use of humidifier and dehumidifier devices. The aerospace and computer technologies have likewise created new demands for humidity sensors.

A wide range of humidity sensors have been developed in recent years in response to these needs. In spite of these developments, however, the need for an accurate, reliable, and yet inexpensive sensor for general purpose humidity measurement and control has not been adequately met.

The most widely used types of sensors for humidity measurement and control applications are the mechanical, wet-bulb, and electrical types. Of these, the mechanical sensors, which depend upon the dimensional changes produced in certain materials by changes in humidity, are by far the most popular. The materials employed here are generally either hair or nylon fiber. Their elongation and contraction can be used to move a pointer on a dial, activate a microswitch, or open a valve for humidity measurement or control purposes. The relative simplicity and low cost of the mechanical devices have contributed greatly to their popularity. However, they leave much to be desired in terms of accuracy, sensitivity, and reliability. Severe hysteresis, slow response, and a drift in calibration due to stretching of the fibers are characteristic of these devices.

Wet-bulb type sensors depend upon the lowering in temperature which occurs upon evaporation of moisture from a surface; the magnitude of the lowering in temperature is a function of the relative humidity. These devices generally use simple mercury thermometers as the temperature sensors and are widely used for humidity measurement. Modifications using thermistors as the temperature sensors have also been used for control purposes. However, the relatively high cost and frequent maintenance required for wet-bulb sensor control devices limit their usefulness in this respect.

Electrical sensors have also found widespread use for the measurement of relative humidity, particularly in scientific applications such as meteorology, where they are employed for remote measurements of the atmospheric moisture content. These sensors commonly consist of an ionic salt, such as LiCl, in an organic binder or a porous substrate; appropriately spaced electrodes are used to make electrical contact. Their response characteristics are quite dependent upon the nature of the salt, the substrate and the electrode system used. In general, they are more sensitive, more accurate, are less subject to drift, and have a more rapid response than the mechanical sensors. On the other hand, they are generally more expensive, and are easily contaminated and damaged by foreign substances in the air and by condensation of water on their surface. The high impedance of most of these devices, particularly at low RH, their limited range, and their high cost have restricted their usage for control applications.

Several electrical sensors have been introduced which overcome some of the difficulties of the ionic salt sensor. One of these employs a polystyrene plate which has been treated with chlorosulfonic acid to produce an ionically conductive layer on the surface. Such a sensor is described, for example, in U.S. Pat. No. 2,728,831 issued Dec. 27, 1955 and titled "Electric Hygrometer." Another apparatus for determining moisture is described in U.S. Pat. No. 2,862,090 issued Nov. 25, 1958. In this patent, there is set forth a humidity-sensitive member comprising a core of cerium titanate and a pair of spaced electrodes in intimate contact therewith. A moisture sensor, which issued as U.S. Pat. No. 3,540,278 on Nov. 17, 1970, describes the device with an electrically insulating substrate, and a pair of metal electrodes mounted on one surface.

Of the wide variety of other devices currently available for general purpose humidity measurement and control applications, none exhibit the unique objects of rapid response, high sensitivity, excellent stability toward a wide variety of environmental conditions and low cost, which are characteristic of the sensor to which our present invention is directed.

In accordance with one aspect of our invention, a humidity sensor has an electrically insulating substrate, a pair of spaced apart interdigitate electrodes mounted on one surface of the substrate, an electrical lead in contact with each of the electrodes, and a thin film of chloromethylated quaternized polystyrene containing from 3.3 to 8.6 percent chlorine adhering to the electrode surface of the sensor.

These and various other objects, features and advantages of the invention will be better understood from the following description taken in connection with the accompanying drawing in which.

Figure 1:
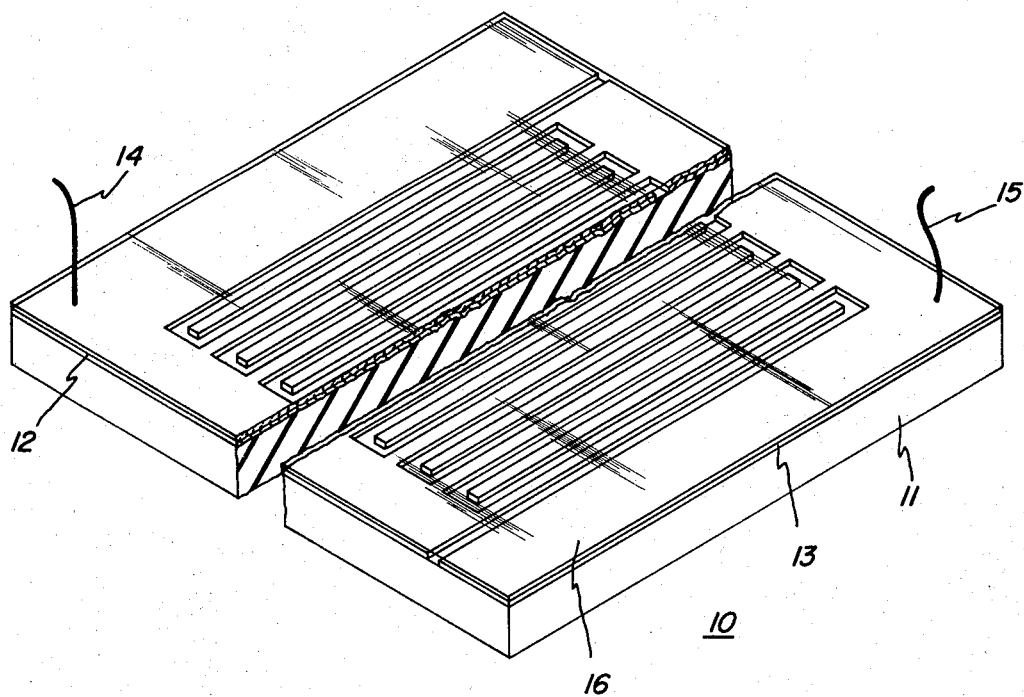
FIG. 1 is a perspective view, partly broken away, of a humidity sensor made in accordance with our invention.

In FIG. 1 of the drawing, there is shown generally at 10 a humidity sensor made in accordance with our invention. Sensor 10 is shown with an electrically insulating glass-epoxy substrate 11, and a pair of spaced apart interdigitated electrodes 12 and 13 mounted on one surface of substrate 11. An electrical lead 14 and 15 is in contact with electrodes 12 and 13, respectively. A thin film 16 of chloromethylated quaternized polystyrene containing from 3.3 to 8.6 percent chlorine adheres to the electrode surface comprising electrodes 12 and 13, and the surface of substrate 11 between the electrodes.

We found that a variety of electrically insulating substrates can be employed in our sensor. However, we prefer to employ a glass-epoxy substrate which is commonly used in making printed circuit boards. Electrodes 12 and 13 are preferably formed by having a copper sheet affixed to the substrate which sheet is etched using standard photoresist methods to provide the pair of electrodes. Various other materials and methods of applying these materials can, of course, be used to produce the electrodes on the substrate. Electrodes 12 and 13 are preferably electroplated with a flash coat of approximately 1,000 Angstroms of gold or silver to protect the copper surface. An electrical lead is connected to each of the electrodes in any suitable manner. The electrode surface is coated with a thin film of chloromethylated quaternized polystyrene containing from 3.3 to 8.6 percent chlorine whereby the film adheres to the electrode surface. The film was preferably coated from a 2–3 percent solution of chloromethylated quaternized polystyrene in an equal ratio mixture of methanol and chloroform. The optimum quantity of polymer for an electrode surface with dimensions of 1 inch × 1.25 inch was found to be .3–4 milligrams. The surface spacing between the interdigitated electrodes can be readily varied to meet specific requirements of resistance range and relative humidity (RH) versus resistance characteristics.

A quaternized polystyrene is a polystyrene which is partially converted to a quaternary amine derivative. The manufacture of this electrolyte involves the chloromethylation and subsequent quaternization of polystyrene.

EQUATION (1)

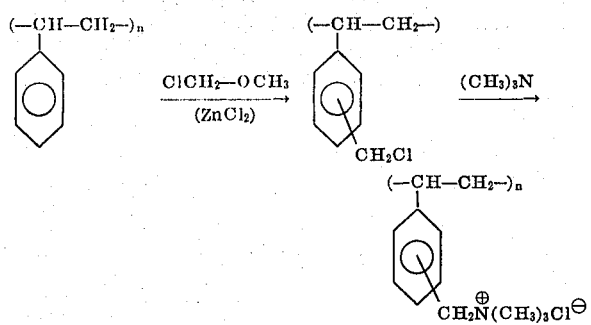

Both reaction steps are known and appear in the literature; however, whereas the known processes generally strive for a high content of ionic groups in the polymer, it is critical for the present application that a certain relatively low level of ammonium groups be present in the polymer, the fairly narrow limits of substitution being prescribed by insufficient conductivity on the one hand and excessive swelling in water on the other. The following reproducible procedure describes attaining the desired level of chloromethylation of the polymer and the conversion of the intermediate into the quaternized polyelectrolyte.

The chloromethylation of polystyrene is carried out to obtain values which correspond to chlorine contents of 3.5–10.0 percent for the chloromethylated but not quaternized resin, about one chloromethyl group for every five to eight repeat units with a range of 3.3 to 8.6 percent chlorine for the quaternized resin. Within the above chlorine range, the optimum range is from 5.5 to 7.0 percent chlorine in the resin. Polystyrene is generally chloromethylated in chloromethylmethylether as the alkylating agent with zinc chloride as a catalyst, without use of solvent or diluent. This procedure leads to a rapid reaction and high levels of substitution. This method does not lend itself well to the synthesis of the product required for the present application.

The procedure adopted for the synthesis of a product containing the desired level of chloromethyl substitution requires a 15-fold excess over the stoichiometrically required amount of chloromethylmethylether. Methylene chloride is used as an inert solvent and diluent and anhydrous zinc chloride is added as a catalyst. No cross-linking is observed under these conditions and the reaction time of around 3 hours is sufficiently long that the time elapsed between monitoring the progress of the reaction and quenching has little effect on the product.

After the reaction mixture has attained the desired viscosity, the reaction is quenched by adding a specified amount of 20 percent water in dioxane and the product is then isolated by adding the reaction mixture with stirring to methanol. The white, fibrous precipitate is collected, air-dried and redissolved in dioxane. A second precipitation step with water as the precipitant is carried out in the same manner; in this way, the complete removal of zinc salts is assured.

The quaternization of chlormethyl polystyrene is accomplished by the reaction of chloromethyl polystyrene with trimethylamine according to Equation (2).

EQUATION (2)

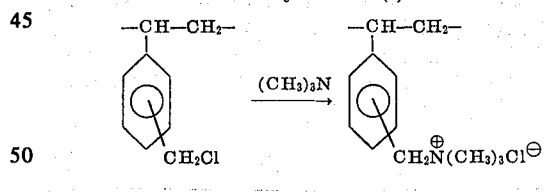

The nature of the tertiary amine is presumably not critical for the performance of the resin. Trimethylamine was chosen because the ease of quaternization is inversely proportional to the size of the amine. Complete conversion to a quaternary resin can readily be achieved by treatment of the chloromethyl polystyrene in dioxane solution with excess trimethylamine at room temperature for 24 hours. Trimethylamine is conveniently applied as a 20 percent solution in dioxane. The produce precipitates from solution before the quaternization is complete. Addition of methanol will bring the polymer back into solution so that the reaction can go to completion. The final product is then recovered by adding the reaction mixture to stirred diethylether or petroleum ether. The product precipitates in the form of a viscous, a sticky white gum which hardens gradually upon prolonged stirring with the precipitant as the methanol is being extracted from the resin. The material is broken up mechanically and dried at 40°–50° C in vacuo.

The above polymer film has low electrical resistivity and high water permeability, yet is essentially insoluble in water. The electrical resistivity of this material is highly dependent upon the ambient relative humidity. This dependence presumably arises from the tendency of the ionic sites in the polymer to absorb water from the atmosphere, resulting in an increased mobility of the Cl⁻ charge carriers. Work with polymers of varying chloride ion content has shown that optimum humidity-sensing characteristics are obtained when the polyelectrolyte contains one chloride ion for every three to four monomer units. At this degree of substitution, the material is readily soluble in a 1:1 methanol:chloroform mixture, yet still insoluble in water. This allows convenient application of the polymer to the substrate by spraying, brushing or dipping; yet, after the coating is dry, repeated immersion in water has no effect upon its electrical or physical properties. The coating also resists abrasion and dust buildup, and does not flake or loosen upon immersion in water or exposure to heat.

Examples of humidity sensors made in accordance with our invention are as follows:

EXAMPLES 1–3

Three groups of humidity sensors, which are identified as Examples 1–3, were made as described above and as shown in the single figure of the drawing. Each sensor of all groups was formed from a one-sixteenth inch thick electrically insulating glass-epoxy substrate with a copper layer affixed to one surface thereof. Each major surface was 1 inch × 1.25 inches. The interdigitated electrodes were formed or mounted by etching into the copper layer using standard photoresist methods. The mask which was employed for this purpose contained 56 electrode patterns. The one difference in the three groups of sensors was the spacing between the electrodes. The sensor groups, Examples 1–3, had electrode separations of 0.015 inch, 0.008 inch, and 0.004 inch, respectively. Each structure had its pair of electrodes electroplated with a flash coating of gold approximately 1,000 Angstroms in thickness to protect the electrodes from oxidation. An electrical lead was soldered to each of the pair of electrodes. The associated surfaces of the electrode and the substrate surface therebetween forms an electrode surface which surfaces were coated with a thin film of chloromethylated quaternized polystyrene containing from 5.5 to 7.0 percent chlorine from a 3 percent solution of an equal ratio of a methanol-chloroform solvent. The quantity of the above polymer for the one major surface of each sensor was 4 milligrams.

EXAMPLE 4

In testing the above sensors for relative humidity versus resistance characteristics, the variation of electrical resistance with relative humidity was determined using a continuous flow, controlled humidity air stream and an AC conductance bridge. The controlled humidity system employs two constant flow streams of air, one thoroughly dried over $H_2SO_4$ and Drierite anhydrous calcium sulfate, and the other saturated with water vapor at a constant temperature slightly below room temperature by passage through two consecutive gas saturating bottles. The streams are equilibrated at room temperature and then mixed in continuously controlled proportions using bleedoff valves to regulate the flows and two flowmeters to determine the relative amounts being mixed. The flow rate of the mixed flow is also monitored to provide a constant flow into a test chamber containing a thermocouple and holders for making electrical contact to seven humidity sensors.

Figure 2:
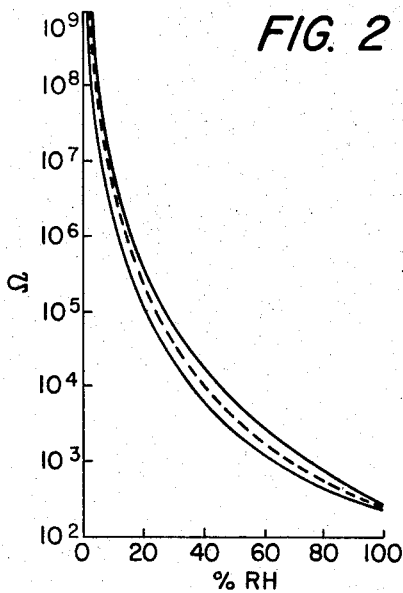
FIG. 2 is a graph showing equilibrium response of a humidity sensor of our invention in which sensor resistance in ohms ($\Omega$) is plotted against percentage of relative humidity (RH)

FIG. 2 shows the equilibrium response and associated hysteresis loop for one sensor from the group of above Example 1 with a 0.0015 inch electrode separation at room temperature (23° C). When the humidity is varied from 0 to 100 percent, a change in resistance of approximately six orders of magnitude takes place. The equilibrium response curve, which is shown as a dotted line in FIG. 2 was derived from the two experimentally determined curves for high-to-low and low-to-high humidities, respectively. The hysteresis is most significant in the middle humidity range, where deviations of up to 6% RH occur. This hysteresis effect is observed for all types of humidity sensors and results from the kinetics of the absorption and diffusion of water in the sensor material. As such, its magnitude is highly dependent upon the experimental conditions employed. The large variation in relative humidity and short time, ≈15 minutes, between the resistance measurements employed leads to a hysteresis considerably larger than would be observed in most applications. Therefore, except for those applications which require very high accuracy at rapidly varying humidities, this effect may be entirely neglected.

EXAMPLES 5–7

Figure 3:
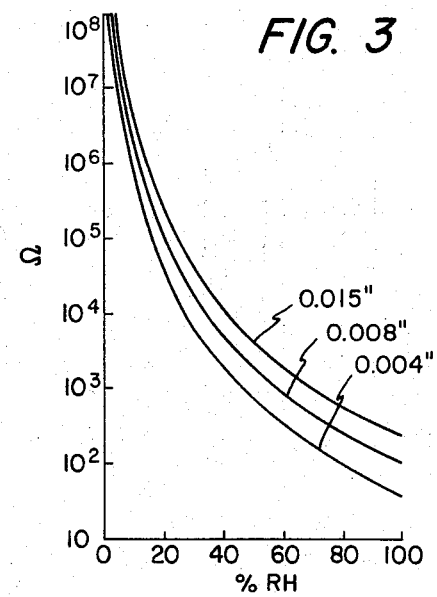
FIG. 3 is a graph showing the effect of changing the electrode separation space wherein the sensor resistances in ohms are plotted against percentages of relative humidity.

A sensor from each of the Examples 1–3 were tested as above described to show the effect of electrode separation spacing. The results are shown in FIG. 3 of the drawing. Decreased electrode separation causes a corresponding decrease in the resistance readings throughout the humidity range. The electrical resistance at high humidity is almost an order of magnitude lower for the 0.004 inch spaced electrodes than for the 0.15 inch separation.

EXAMPLES 8–10

A sensor from Example 1 was employed to show the effect of temperature upon the humidity sensor. For these tests at temperatures of 15° and 40° C which are below and above room temperature, some modifications in the above procedure were necessary. In these cases a single stream of air was saturated with water vapor by passage through two consecutive gas saturating bottles placed in a thermostated bath at temperature, $T_1$, and then warmed to the test temperature, $T_2$. This stream was then passed through a glass test chamber, containing a thermocouple and a humidity sensor with electrical connections; the test chamber was immersed in a thermostated bath at temperature $T_2$.

Figure 4:
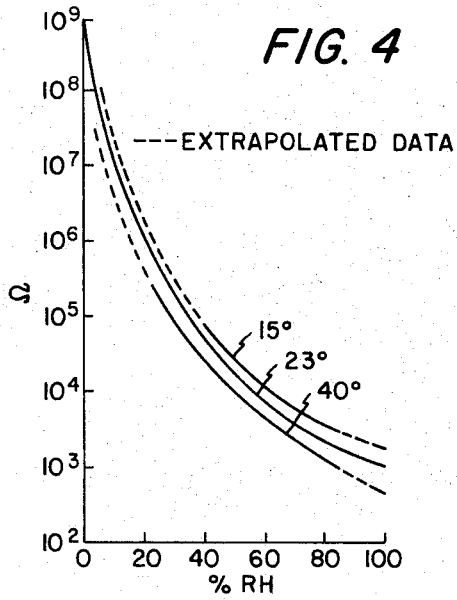
FIG. 4 is a graph similar to FIGS. 2 and 3 showing the effect of temperature upon humidity sensor calibration.

Measurements were made at 15°, 23° and 40° C on a sensor with a 0.015 inch electrode separation, showing a general decrease in resistance with increasing temperature. Calibration at 15° and 40° was carried out in the variable temperature apparatus described above, while the 23° calibration was carried out using the standard mixed flow system. The temperature effect increases the %RH at a given resistance by about 0.5% RH per degree centigrade increase in temperature over most of the humidity range. The results are shown in FIG. 4.

EXAMPLE 11

Figure 5:
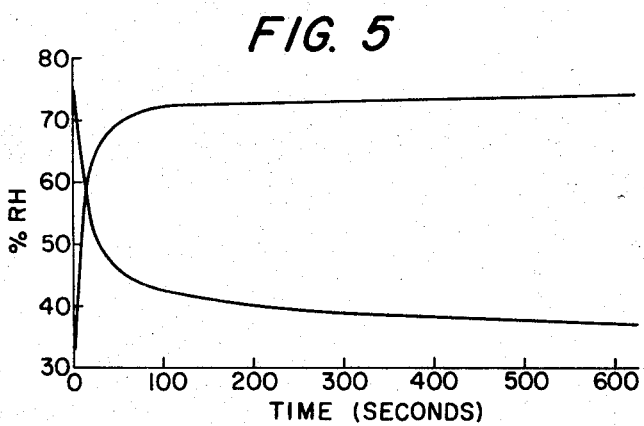
FIG. 5 is a graph showing response time of a humidity sensor in which humidity in percentage of relative humidity is plotted against time in seconds.

A humidity sensor from Example 1 was tested for response time. The time required for the sensor to respond to changes in relative humidity was determined using a specially designed flow system. This system employed two air streams at 33 percent and 75% RH each equilibrated by means of three consecutive gas saturating bottles. For the 33% RH stream the first saturator as filled with 50% $H_2SO_4$ and the others with saturated $MgCl_2$ solution; for the 75% RH stream, 30% $H_2SO_4$ in combination with saturated NaCl solutions were used. These air streams were led into a test chamber through a two-way stopcock. The chamber was designed to accommodate the sensor and a holder with minimal excess volume. The atmosphere in the chamber was alternated between 33% and 75% RH by turning the stopcock. The resistance of the sensor was determined as a function of time using the Wayne Kerr AC bridge. This was accomplished by setting the bridge for a balance at a pre-determined set point and measuring the time required to reach this balance point after the stopcock was turned. The results of response time measurements for a sensor with a 0.015-inch electrode separation are shown in FIG. 5. The abrupt change in %RH causes an exponential change in electrical resistance with time; the sensor reaches 63 percent of full response in seconds. Response is faster for increasing than decreasing RH, as is typical for absorptive type humidity sensors.

EXAMPLE 12

The stability of the sensor's resistance vs. relative humidity characteristics toward a number of physical and environmental effects was examined.

Sensors from Examples 1, 2, and 3 were calibrated and then stored for extended periods under room humidity condition, and in sealed containers under both high and low humidity conditions. The sensors were recalibrated periodically. The electrical properties of the sensors were not affected by long-term storage under any of these conditions.

EXAMPLE 13

Sensors from Examples 1–3 were contacted with water, both from atmospheric condensation, and by direct immersion, and had no effect upon the sensor's electrical characteristics or physical appearance.

EXAMPLE 14

Figure 6:
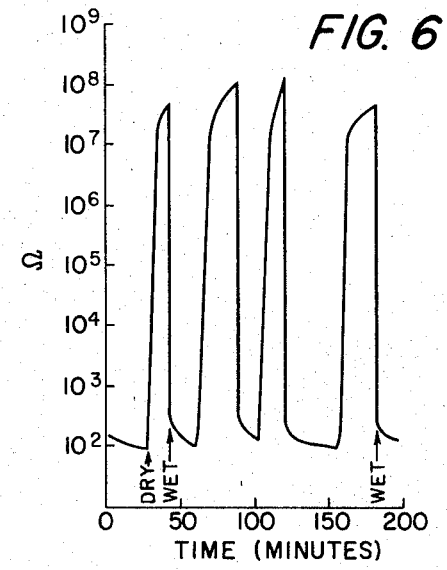
FIG. 6 is a graph showing humidity cycling in which sensor resistance in ohms is plotted against time in minutes.

Using apparatus similar to that described above for response time measurements, a sensor from Example 1 was cycled repeatedly between humidity extremes of nearly 0 and 100% RH, while the resistance was monitored by an AC bridge. FIG. 6 shows the first four of seven complete cycles in a 5-hour period. After each cycle the sensor returned to the same resistance value at approximately 100% RH, indicating high stability toward rapid and repeated cycling of the humidity. A sensor which had not been plated with gold or silver, that is the polymer was applied directly to the copper electrodes, exhibited a significant increase in the resistance after each cycle. In this case, a green deposit on the electrodes indicated the formation of $Cu(OH)_2$.

While other modifications of the invention and variations thereof which may be embraced within the scope of the invention have not been described, the invention is intended to include such as may be embraced within the following claims:

What we claim as new and desire to secure by Letters Patent of the United States is:

1. A humidity sensor responsive to changes in atmospheric water content by changes in electrical resistance which comprises an electrically insulating substrate, a pair of spaced apart interdigitated electrodes positioned on one surface of the substrate, an electrical lead in contact with each of the electrodes, and a thin film of chloromethylated quaternized polystyrene containing from 3.3 to 8.6 percent chlorine adhering to the electrode surface of the sensor.

2. A humidity sensor as in claim 1, in which the chlorine range is 5.5 to 7.0 percent chlorine.

3. A humidity sensor as in claim 1, in which the substrate is a glass-epoxy material.

4. A humidity sensor as in claim 1, in which the electrodes are copper and are plated with gold.

5. A humidity sensor as in claim 1, in which the electrodes are copper and are plated with silver.

6. A humidity sensor as in claim 1, in which the electrodes are spaced apart 0.004 inch.

7. A humidity sensor as in claim 1, in which the electrodes are spaced apart 0.008 inch.

8. A humidity sensor as in claim 1, in which the electrodes are spaced apart 0.015 inch.

9. A humidity sensor as in claim 1, in which the substrate is a glass-epoxy material, the electrodes are copper and are plated with gold, and the chlorine range is 5.5 to 7.0 percent chlorine.

* * * * *